Feb. 10, 1925. 1,526,244
C. R. SHANNON
PISTON AND ROD CONSTRUCTION
Filed Jan. 16, 1923   2 Sheets-Sheet 1

Inventor
C. R. Shannon
By C. A. Snow & Co.
Attorneys

Feb. 10. 1925.

C. R. SHANNON

PISTON AND ROD CONSTRUCTION

Filed Jan. 16, 1923

1,526,244

2 Sheets-Sheet 2

C. R. Shannon Inventor

By C. A. Snow & Co.
Attorneys

Patented Feb. 10, 1925.

1,526,244

UNITED STATES PATENT OFFICE.

CHARLES R. SHANNON, OF HARLAN, KENTUCKY.

PISTON AND ROD CONSTRUCTION.

Application filed January 16, 1923. Serial No. 612,965.

*To all whom it may concern:*

Be it known that I, CHARLES R. SHANNON, a citizen of the United States, residing at Harlan, in the county of Harlan and State of Kentucky, have invented a new and useful Piston and Rod Construction, of which the following is a specification.

This invention aims to provide a simple means whereby the bearings of a connecting rod in an internal combustion engine may be tightened up and adjusted from the top of the engine, without removing the crank case.

Figures 1, 2, 3:
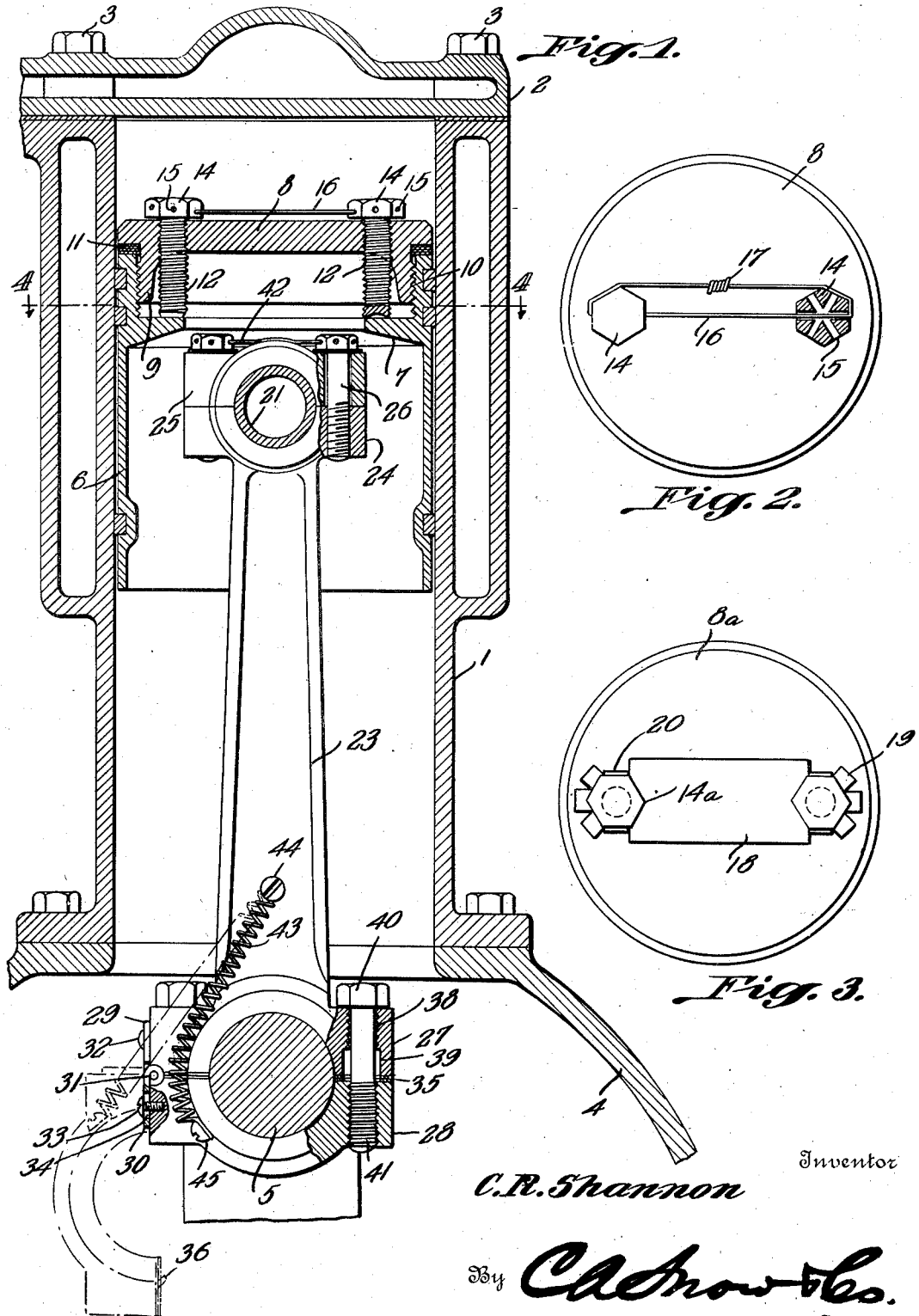
Figure 4:
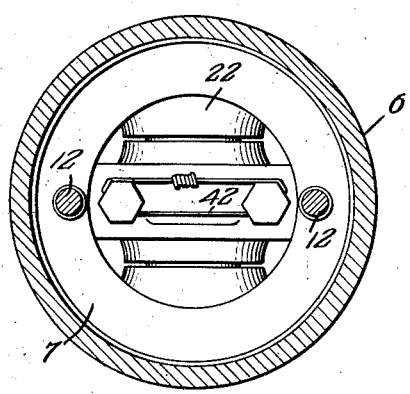
Figure 6:
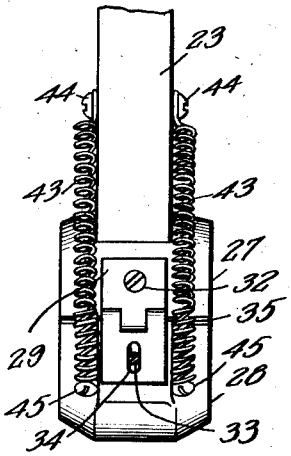
Figure 5:
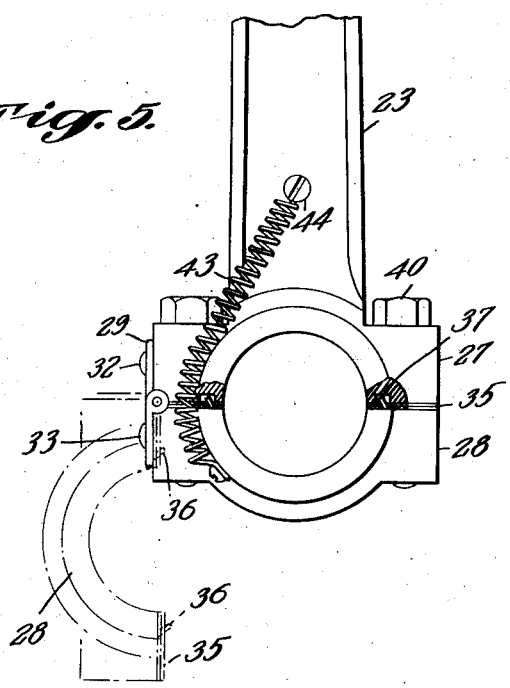
Figure 7:
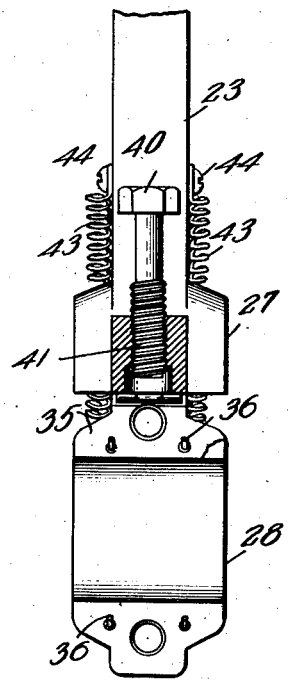

In the drawings:—Figure 1 shows in section, an engine embodying the invention; Figure 2 is a plan of the piston head; Figure 3 is a plan showing a modification; Figure 4 is a section on the line 4—4 of Figure 1, parts being omitted; Figure 5 is a side elevation showing the lower end of the connecting rod and attendant parts; Figure 6 is an elevation wherein the lower end of the connecting rod is viewed edgewise; Figure 7 is an elevation wherein that part of the device which appears in Figure 5 is shown edgewise.

The numeral 1 marks the cylinder of an internal combustion engine, the head 2 being held on the cylinder by screws 3 or equivalent securing elements, the crank case being shown at 4 and the crank at 5. The piston includes a hollow body 6 having an internal annular shoulder 7. The piston head 8 has a hollow neck 9 threaded at 10 into the body 6 of the piston, annular shims 11 being interposed between the head 8 and the upper end of the piston body 6. The shims 11 may be removed, one or more at a time, to regulate the compression. Securing devices 12, such as screws, having enlargements 14, are threaded into the piston head 8 and bear on the internal shoulder 7 of the piston body, so as to prevent the head 8 from rotating and becoming disengaged from the piston body 6. There are openings 15 in the heads 14 of the screws 12 adapted to receive a locking device 16 in the form of a wire, the ends of which are twisted together at 17, the locking device preventing the screws 12 from loosening in the piston head 8. As shown in Figure 3, the screws which pass through the piston head 8ª pass likewise through a washer plate 18 having tongues 19 adapted to be bent as shown at 20, to engage the heads 14ª of the screws, the washer plate being adapted to replace the wire 16, should the designer prefer the washer plate to the wire.

The pin 21 is mounted at 22 in the usual way in the body 6 of the piston. A connecting rod 23 is provided at its upper end with a bearing 24 cooperating with a bearing 25 to receive the pin 21. Securing members 26, such as screws, pass through the bearing 25 and are threaded into the bearing 24, the screws being held against rotation by a locking device 42, of any desired construction, and shown in Figure 4. On the lower end of the connecting rod 23 there is a bearing 27 cooperating with a bearing 28 to receive the crank 5, the bearings being united by a hinge including a plate 29 and a plate 30 which are pivotally connected at 31, the plate 29 being secured at 32 to the bearing 27, and the plate 30 having a slot 34 receiving a securing member 23 which enters the bearing 28. Shims 35 are located between the bearings 27 and 28 and are carried on projections 36 which form part of the bearing 28. Owing to the presence of the slot 34, the hinge may be adjusted in accordance with the number of shims 35 used. The bearing 27 has openings 37 for the reception of the projections 36 when the bearing 28 is closed with respect to the bearing 27. The bearing 27 has bores including threaded portions 38 and enlarged smooth portions 39. Screws 40 are provided and are supplied with threaded portions 41 engaging the bearing 28 the heads of the screws cooperating with the bearing 27. Retractile springs 43 are secured at 44 to the rod 23 and at 45 to the bearing 28. When the bearing 28 is closed as in Figure 1, the pull of the springs 43 is inside the pivotal connection 31 between the hinge plates and tends to hold the bearing 28 closed. When the bearing 28 is in open position, as in Figure 5, the pull of the springs 43 is outside the point 31 and tends to hold the bearing 28 in open position.

In practical operation, the screws 3 may be removed and the cylinder head 2 taken off. This exposes the piston head 8. The screws 14 may be removed from the piston head 8, thereby setting the piston head free for rotation, so that it can be threaded out of the piston body 6. The screws 26 now are exposed and may be removed, the bearing 25 being detached. The screws 40 may be threaded upwardly until their threaded portions 41 engage with the threaded portions 28 of the bores in the bearing 27. The bearing 28 thus is set free, and a touch with a screw driver or like tool will cause the bearing to swing downwardly into the depending position shown in Figure 5, the springs 43 holding the bearing 28 in the position mentioned, whereupon the rod 23 may be withdrawn. The projections 36 on the bearing 28 hold the shims in place, and when it is desired to engage the bearing 28 again with the crank 5, a touch with a screw driver or other tool will cause the bearing 28 to snap from open to closed position, it being recalled that the closing movement of the bearing 28 is not impeded by the screws 40, since the screws have been raised until their threaded ends 41 are engaged with the threads 38 of the bearings 27.

A casual inspection of the drawings taken with the foregoing description, will make it manifest that both the upper and lower bearings of the connecting rod may be set up and adjusted from the top of the engine and without detaching the crank case 4.

I claim:—

1. In a device of the class described, a piston body having an internal shoulder; a head threaded into the body; and a screw threaded into the head and engaging the shoulder.

2. In a device of the class described, a piston body having an internal shoulder; a head threaded into the body; and a screw threaded into the body and engaging the shoulder; and means for holding the screw against rotation.

3. In a device of the class described, a piston body having an internal shoulder; a head threaded into the body; shims interposed between the edge of the head and the end of the body; and a screw threaded into the head and engaging the shoulder.

4. In a device of the class described, a piston body having an internal shoulder; a head threaded into the body; screws threaded into the head and engaging the shoulder; and means for connecting the screws to hold them against rotation.

In testimony that I claim the foregoing as my own, I have hereto affixed my signature in the presence of two witnesses.

CHARLES R. SHANNON.

Witnesses:
  Mason B. Lawton,
  F. L. Search.